Patented June 1, 1926.

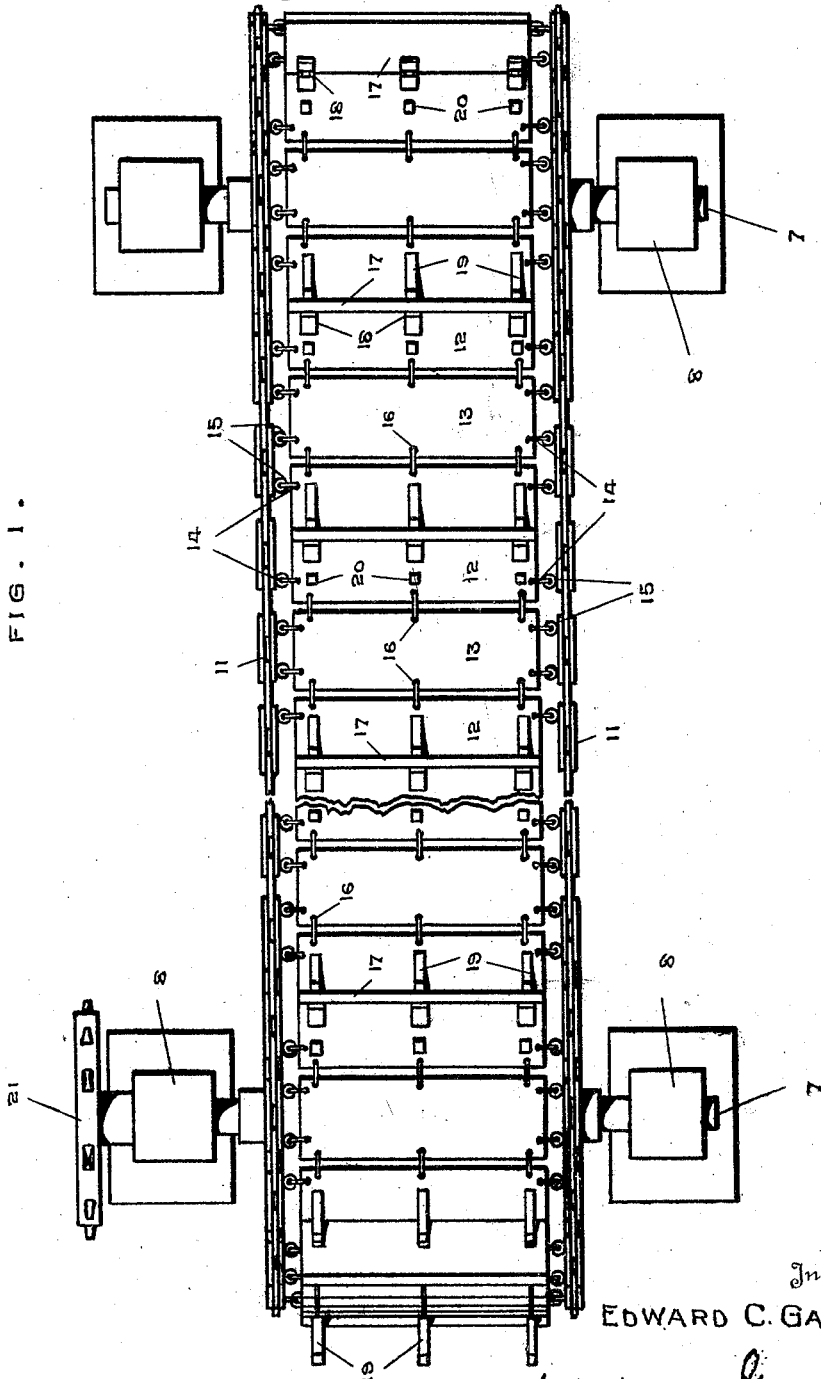

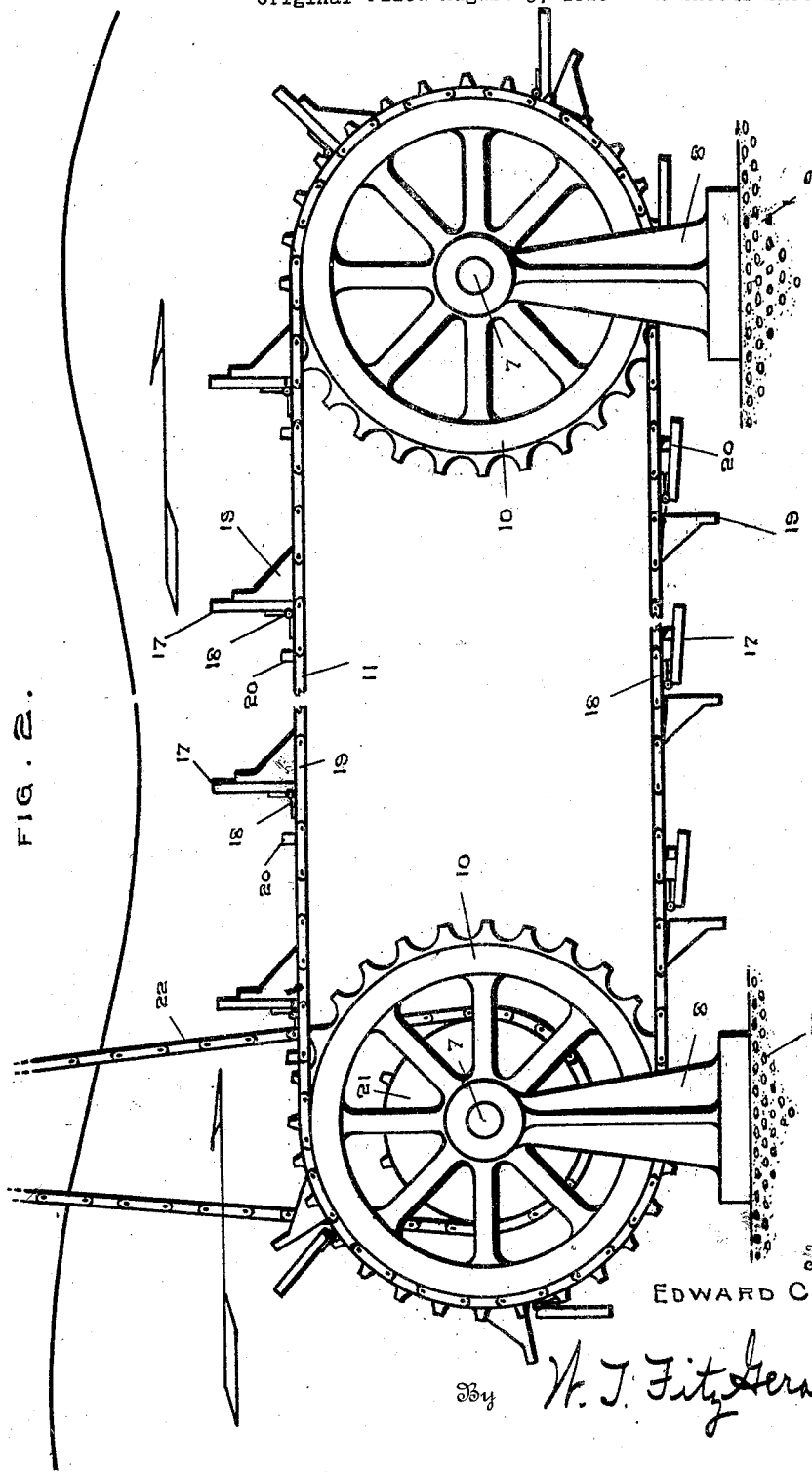

1,587,071

UNITED STATES PATENT OFFICE.

EDWARD C. GATLIN, OF LOS ANGELES, CALIFORNIA.

TIDE MOTOR.

Application filed August 6, 1923, Serial No. 656,080. Renewed April 12, 1926.

The present invention relates to a tide motor for utilizing for power purposes the incoming and outgoing tides or such wave motion caused by the ebb and flow of the tides.

The object of the invention is to construct the motor with a novel belt having means whereby the force of the water or waves, whether incoming or outgoing, is transmitted to the belt, from which the power can be transmitted.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a plan view of the improved tide motor.

Fig. 2 is a side elevation thereof.

In carrying out the invention, a pair of parallel shafts 7 is journaled in pedestals 8, preferably by housed anti-frictional bearings, and said pedestals are mounted on a suitable base or foundation 9 of concrete or other material disposed on the bed of the water. A pair of sprocket wheels 10 is secured on each shaft and are spaced apart a suitable distance, and spaced parallel sprocket chains 11 are trained around said sprocket wheels and may be of any suitable length, according to the size of motor wanted.

The sprocket chains 11 constitute portions of the power belt, and such belt includes the alternate plates 12 and 13 of sheet metal, wood or other suitable material. Said plates are disposed transversely between the sprocket chains and the ends of the plates are connected loosely by links 14 with eyes or loops 15 carried by the sprocket chains 11, so as to flexibly connect said plates with the sprocket chains. The plates 12 and 13 are of shorter length than the distance between the chains 11, so that the ends of the plates are spaced from the sprocket chains, thereby permitting the plates to pass between the sprocket wheels within the outer peripheries of said sprocket wheels. The adjacent edges of the plates are also flexibly connected by means of links 16. The belt is thus of flexible construction, and where the sprocket chains pass around the sprocket wheels, the plates are disposed between the sprocket wheels and said plates can pass around the bends of the belt without interference, because of the flexible connections of the plates with one another and with the chains. The belt is thus light in weight and strong in construction.

Blades or paddles 17 are hinged, as at 18, on the plates 12, transversely of the belt, to swing toward the belt rearwardly with reference to the direction of movement of the belt and to swing outwardly at an angle or perpendicularly with the belt forwardly with reference to the direction of movement of the belt. Braced stops 19 are secured on the plates 12 in front of the blades 17 for the contact of said blades when they are swung outwardly to unfolded or active position, and stops 20 are carried by said plates 12 in rear of the blades 17 for the contact of the blades when they are swung inwardly to folded or inactive position, thus holding the blades spaced slightly from the plates 12.

The power is taken from one of the shafts 7 in any suitable manner. As shown, a sprocket wheel 21 is secured on one of the shafts 7 and a sprocket chain 22 extends outwardly out of the water from said sprocket wheel for transmitting the power, and a suitable fly-wheel can be provided for rendering the motion more even. The power can be used for driving an electric generator or any other machine or device, so as to utilize the power obtained from the water.

The motor is positioned in the water with the belt substantially at right angles to the line of movement of the water, with one shaft 7 further out to sea than the other, and the entire belt is submerged. The blades 17 at the upper run of the belt swing open toward the land and swing closed toward the sea, while the blades at the lower run of the belt swing open toward the sea and swing closed toward the land. When the waves or inflowing water passes over the belt, moving in the direction of the arrows as in Fig. 2, the action of the water against the blades 17 will swing said blades to active position against the stops 19, and the pressure of the water against such blades will move the upper run of the belt toward the land. If the water moves toward the land, the blades 17 at the lower run of the belt are swung inwardly so as to offer the least possible resistance to the water. When the water moves outward, such as when there is an undertow, the water catching the lower blades 17 will swing same away from the land and outwardly so that the pressure of the water against the lower blades will move the lower run of the belt away from the land. Should the water pass outwardly over the belt, the blades 17 at the upper run of the belt are swung against the belt so as to offer the least resistance to the water. Should the water pass over the belt toward the land and under the belt away from the land, the blades of both runs of the belt are opened to receive the water pressure, so that the belt is actuated with double energy or power. The belt moves in the same circuitous direction at all times, and when the motion of the water is contrary to that of the belt, the blades are swung to folded position against the belt so as to minimize any tendency for the belt being actuated reversely.

The motor can also be used in rivers and other waters where the flow is in the same or opposite directions, inasmuch as the motor will operate with the water flowing in the same direction continuously, as well as when the flow of water is in either direction.

Having thus described the invention, what is claimed as new is:—

1. A water motor comprising two pairs of sprocket wheels, a pair of sprocket chains trained around said wheels, plates between said sprocket chains and of shorter length than the distance between said chains, with the ends of the plates spaced from said chains to pass between the wheels of each pair, links flexibly connecting said plates and chains, and blades connected to said plates to swing outwardly and inwardly to operative and inoperative positions.

2. A water motor comprising sprocket chains, means for mounting same for circuitous movement, plates between the chains, means flexibly connecting said plates with one another and with the chains, and blades carried by some of said plates to move outwardly and inwardly with reference to the plates.

3. A water motor comprising a pair of sprocket chains, means for mounting same for circuitous motion, plates disposed between and connected to said sprocket chains, blades hinged to said plates, and stops carried by said plates for limiting the movement of said blades when swung outwardly and inwardly.

In testimony whereof I have signed my name to this specification.

EDWARD C. GATLIN.